Patented Oct. 13, 1936

2,056,984

UNITED STATES PATENT OFFICE 2,056,984

SEPARATION OF UNSAPONIFIABLE MATTER FROM SAPONIFIABLE MATERIALS CONTAINING THE SAME

Max Schellmann, Oppau, and Hans Franzen, Mannheim, Germany, assignors to I. G. Farbenindustrie Aktiengesellschaft, Frankfort-on-the-Main, Germany No Drawing. Application March 21, 1932, Serial No. 600,374. In Germany April 18, 1931

9 Claims. (Cl. 87—16)

The present invention relates to the separation of unsaponifiable matter from saponifiable materials containing the same.

It has already been proposed to separate unsaponifiable constituents of high molecular weight such as alcohols from fats, oils and waxes, such as wool fat, containing the said constituents, by saponification of the saponifiable matter and subsequent distillation while introducing the vapors of inert liquids. This method has the disadvantage that the soaps formed, after expelling the water contained in the material to be subjected to distillation, become solid with the result that during the further heating a decomposition of at least that fraction of the material to be distilled which is in the neighborhood of the still walls takes place with the formation of unsaponifiable substances such as hydrocarbons. This is especially the case when it is desired to separate the unsaponifiable constituents of oxidation products of aliphatic hydrocarbons from the saponifiable constituents of high molecular weight. Thus the recovery of unsaponifiable constituents of high molecular weight from oils, fats, waxes and the like by this method can only be carried out with a great loss of saponifiable constituents. Moreover, the said method has the disadvantage that it can only be rendered continuous with very great difficulty by reason of the necessity for moving semi-solid to solid residues in and from the stills.

We have now found that the separation, by saponification and distillation, of unsaponifiable substances of high molecular weight from saponifiable materials of high molecular weight containing the same, such as oils and fats of vegetal, i. e., vegetable and animal origin, waxes containing esters or oxidation products of aliphatic and cycloaliphatic hydrocarbons or like mixtures of carboxylic acids, or esters, and unsaponifiable matter can be carried out while protecting the material to be worked to a very great extent by converting the saponifiable constituents within the crude product, before the distillation, into an aqueous mixture of magnesium, calcium and potassium soaps in such relative proportions that the melting point of the crude saponification product, when in the anhydrous state, is below 150° C. The term "of high molecular weight" is meant to define bodies, or mixtures thereof, which contain carboxylic acids with at least 8 carbon atoms and may contain carboxylic acids with up to say 25 or 30 carbon atoms as occur for example in Montan wax or in the said oxidation products. For the sake of brevity the said materials will be referred to in the following and in the claims as "saponifiable, high molecular materials".

For example the different bases, such as calcium and magnesium oxides, hydroxides or carbonates and potassium hydroxide or carbonates may be added simultaneously or consecutively to the product to be saponified. In the latter case, it is preferable to add the weakest base first and then to introduce the remaining bases according to the degree of their alkalinity. In this manner mixtures of soaps are obtained which melt in an anhydrous state even at slightly elevated temperatures. Thus for example an oxidation product of paraffin wax, saponified in accordance with the present invention and consisting of 7 per cent of potassium soap, 7 per cent of calcium soap, 36 per cent of magnesium soap and 50 per cent of unsaponifiable substances, has a melting point of about 80° C. in the anhydrous state. The preparation of the soap mixtures may also be effected by mixing in suitable proportions different products which have each been saponified with one base only. Difficultly saponifiable materials such as sperm oil and carnauba wax may be saponified in a closed vessel at temperatures above 100° C. such as from about 170° to about 200° C. so that a considerable pressure is generated in the vessel. This method is also advantageous on working with the carbonates of the bases. The ratio of the three soaps is not limited to the specific proportions set out above but, generally, the composition of the mixed soaps may vary between from about 5 to about 25 per cent each of calcium and potassium soaps the remaining quantity up to 100 per cent consisting of magnesium soaps. Preferably the proportions are chosen in the ratio of from about 14 to about 20 per cent each of calcium and potassium soaps. It is not necessary that calcium and potassium soaps be present in the same proportions but calcium soaps should generally not be present in a quantity of more than 65 per cent of the mixture of calcium and potassium soaps. The saponification may be carried out in the absence of any substantial quantities of water but it is considerably accelerated by adding some water the amount of which is preferably chosen for practical purposes corresponding to the amount of the bases employed and generally about 3 times their weight though also higher quantities may be used.

The saponification may be carried out without warming but in many cases the reaction proceeds unduly slowly so that warming to at least 90° C. is preferred in most cases. Especially with initial materials which are difficultly saponified, such as carnauba or bees waxes, the temperature is preferably increased above 100° C. as for example up to about 170° C. or still higher, which temperature, however, must be of course below the decomposition temperatures of the materials worked.

The soap mixtures are subjected to distillation preferably under reduced pressure and while introducing wet, saturated or superheated vapors of inert liquids, such as water, benzene, toluene and the like, or while introducing inert gases, such as hydrogen, nitrogen, carbon dioxide, mineral gas or sulphur dioxide. When distilling a soap mixture of the said kind, the distillation material remains liquid during the whole period of treatment in spite of the removal of the unsaponifiable constituents. Any local overheating and consequent danger of the formation of unsaponifiable substances may be still further strongly reduced by keeping the mass continually in motion, on working at atmospheric pressure, by the introduction of vapors or gases and if desired by stirring. The distilling off of the unsaponifiable substances may also be effected by applying the liquid material to be subjected to distillation in thin layers to heated surfaces, as for example rotating rollers, and exposing them for a short time to the distillation temperature, whereby inert gases or vapors may be introduced into the distillation apparatus, if desired, in order to lead away the volatile constituents. After distilling off the unsaponifiable substances by either of the said methods, the remaining soap mixture for example from an oxidation product of paraffin wax as described above has a melting point of about 170° C.

A further special advantage of the process according to this invention consists in the fact that the distilling off of the unsaponifiable substances may readily be rendered continuous, as for example may be carried out according to the British Patent No. 213,267. In this case also a far reaching protection of the distillation material is ensured by reason of the short duration of the heating.

The difficultly volatile unsaponifiable substances, having boiling points above those of the main quantity of carboxylic acids, which substances distill over last of all need not be completely distilled off because they remain to a large extent in the distillation residue remaining in a subsequent purification of the crude fatty acids by steam distillation or by distillation according to the said British Patent No. 213,267. If desired, the soap mixture may be also converted in a sodium soap by boiling with sodium carbonate solution, if desired in a closed vessel and above 100° C., the uniform sodium soap being then ready for use if desired after any usual and convenient purification or bleaching treatment.

The following examples will further illustrate how the said invention may be carried out in practice, but the invention is not restricted to these examples.

*Example 1*

The saponifiable constituents within raw wool fat are saponified to the extent of 54 per cent with magnesium oxide and to the extent of 16 per cent with calcium oxide and to the extent of 30 per cent with caustic potash. The water-containing saponification product is then subjected to distillation, while stirring and while introducing wet steam, at about 30 millimeters (mercury gauge). After expelling the water, the unsaponifiable substances are distilled off from the liquid soaps by increasing the temperature up to 300° C. The distillate consists of 93.5 per cent of unsaponifiable substances while the soaps yield by the addition of dilute sulphuric acid a dark colored fatty acid mixture having a content of 1.7 per cent of unsaponifiable substances. By a distillation in vacuo with superheated steam, a very pale fatty acid mixture is obtained having an acid value of 195.8, a saponification value of 196.7 and a content of 0.7 per cent of unsaponifiable substances.

*Example 2*

1000 parts of a crude liquid-phase oxidation product of paraffin wax prepared by blowing with air and having a saponification value of 146 and containing 45.4 per cent of unsaponifiable substances are saponified to the extent of 70 per cent with 40.5 parts of magnesium oxide and to the extent of 15 per cent each with 12 parts of calcium oxide, 23 parts of caustic potash and 500 parts of water and then subjected to distillation according to Example 1. The temperature is raised to 330° C. The working up of the residual soaps is effected as described in Example 1. The crude fatty acid mixture containing 2.5 per cent of unsaponifiable substances yields, after another distillation, a pale fatty acid mixture which only contains 1.4 per cent of unsaponifiable substances. The saponification product may also be subjected to a continuous distillation according to the said British Patent No. 213,267 at a pressure of 30 millimeters (mercury gauge) and a temperature rising to 320° C. The distillate in this case consists to the extent of 95.3 per cent of unsaponifiable substances. The working up of the resulting soap mixture and purification as described in Example 1 yields a very pale fatty acid only containing 1.6 per cent of unsaponifiable substances.

Instead of distilling the crude soap mixture as described in Example 1, it may be subjected to a distillation by employing rotating rollers. For this purpose the crude saponified oxidation product of paraffin wax is led slowly into a pressure-tight, so-called roller dryer provided with a descending condenser. The material to be subjected to distillation which spreads out on the moving rollers which are rotated in opposite direction and heated to about 350° C. gives off in a very short time, at this temperature and at a pressure of about 90 millimeters (mercury gauge), the volatile unsaponifiable substances which are led away by a current of steam superheated to about 300° C. which is led over the rollers. The remaining soaps are worked up as hereinbefore described.

*Example 3*

The saponifiable constituents in a brown product containing fatty acids and having the acid value of 147, a saponification value of 169 and a content of 28 per cent of unsaponifiable substances (obtained by distilling the distillation residue of fatty acids from sulphur olive oil) are sponified to the extent of 60 per cent with magnesium oxide and to the extent of 20 per cent each with calcium oxide and caustic potash. The water is expelled from the resulting mixed soap and then the unsaponifiable substances are removed by a distillation with steam heated to 300° C. and at a pressure of 20 millimeters (mercury gauge); the temperature being gradually raised to 280° C. The remaining mixed soap is worked up as described in Example 1. A dark colored crude fatty acid mixture having a content of 1.5 per cent of unsaponifiable substances is obtained. A fresh distillation yields a pale yellow odourless fatty acid mixture which has a content of 1 per cent of unsaponifiable substances and from which a snow-white soap may be prepared.

Example 4

1000 parts of crude bees-wax having a saponification value of 101.2 are saponified by heating in an autoclave for 5 hours to about 170° C. (at a pressure of about 8 atmospheres) together with 28 parts of magnesium hydroxide, 8.4 parts of calcium hydroxide, 15.7 parts of potassium hydroxide and 500 parts of water, the first 2 hydroxides being thus employed in a quantity exceeding that theoretically required by 10 per cent and potassium hydroxide in an excess of 5 per cent. A soap is thus obtained in which the fatty acids are saponified to the extent of 70 per cent with magnesium and of 15 per cent each with calcium and potassium. After the saponification the pressure is released into a collecting vessel and the remaining unsaponifiable constituents of bees-wax are removed from the liquid mixed soap by passing steam superheated to 300° C. through the autoclave at a pressure of about 30 millimeters of mercury. The temperature is then raised for 5 minutes to 300° C. The remaining mixed soap contains 2.7 per cent of unsaponifiable matter. By liberating the fatty acids by acidification with an aqueous sulphuric acid solution and distillation in vacuo while introducing superheated steam, pale colored fatty acids are obtained.

Example 5

1000 parts of crude carnauba wax having a saponification value of 95.5 are saponified by heating in an autoclave for 8 hours to 200° C. (at a pressure of about 16 atmospheres) together with 27 parts of magnesium oxide, 8 parts of calcium oxide, 15 parts of potassium hydroxide and 500 parts of water, the first 2 hydroxides being thus employed in a quantity exceeding that theoretically required by 10 per cent and potassium hydroxide in an excess of 5 per cent. A soap is thus obtained in which the fatty acids are saponified to the extent of 70 per cent with magnesium and of 15 per cent each with calcium and potassium. After the saponification the resulting mass is worked up and subjected to distillation as described in Example 4 while finally heating to 320° C. The soap then contains 3.4 per cent of unsaponifiable matter and is worked up as described in Example 4.

Example 6

1000 parts of crude sperm oil having a saponification value of 140.5 are saponified by heating in an autoclave for 3 hours, while stirring, to about 170° C. (at a pressure of about 8 atmospheres) together with 39 parts of magnesium oxide, 12 parts of calcium hydroxide, 23 parts of potassium hydroxide and 750 parts of water, the first 2 hydroxides being thus employed in a quantity exceeding that theoretically required by 10 per cent and potassium hydroxide in an excess of 5 per cent. A soap is thus obtained in which thefatty acids are saponified to the extent of 70 per cent with magnesium and of 15 per cent each with calcium and potassium. The resulting product is then subjected to a continuous distillation by releasing the content of the autoclave through a bottom valve or through an ascending pipe into a device for a continuous distillation as described in the British Patent No. 213,267 and carrying out the distillation at 260° C. and at a pressure of 40 millimeters of mercury. The soap mixture which is thus freed from unsaponifiable matter to the extent of 2.2 per cent, remains liquid even at 130° C. It is then worked up as described in Example 4.

Example 7

1000 parts of a product of an incomplete hydrogenating reduction of stearic acid according to the British Patent No. 356,731 and having a saponification value of 135.7 are saponified by heating at atmospheric pressure for 2 hours to 95° C., while stirring, with the aid of 37.6 parts of magnesium oxide, 11.4 parts of calcium oxide and 500 parts of water. 21.4 parts of potassium hydroxide dissolved in 100 parts of water are then added and heating is continued further for 2 hours, the first 2 hydroxides being thus employed in a quantity exceeding that theoretically required by 10 per cent and potassium hydroxide in an excess of 5 per cent. A soap is thus obtained in which the fatty acids are saponified to the extent of 70 per cent with magnesium and of 15 per cent each with calcium and potassium. The alcohols set free by the saponification are then distilled off at atmospheric pressure with the aid of superheated steam. The soap mixture which contains 1.3 per cent of unsaponifiable matter is then worked up as described in Example 4. The purified fatty acid can be subjected anew to hydrogenation according to the beforementioned process.

Example 8

1000 parts of crude wool fat having a saponification value of 182.7 are saponified with the aid of 43 parts of magnesium oxide, 20 parts of calcium oxide, 37 parts of potassium hydroxide and 500 parts of water, the first 2 hydroxides being thus employed in a quantity exceeding that theoretically required by 10 per cent and potassium hydroxide in an excess of 5 per cent. A soap is thus obtained in which the fatty acids are saponified to the extent of 60 per cent with magnesium and of 20 per cent each with calcium and potassium. The resulting aqueous product is then subjected to distillation with wet steam at a pressure of about 30 millimeters of mercury. After removal of the water the unsaponifiable matter is distilled off by slowly raising the temperature to 280° C. The distillate consists to the extent of 93.5 per cent of unsaponifiable matter, whereas the soap, by decomposition with aqueous sulphuric acid, furnishes fatty acid with a content of 1.7 per cent of unsaponifiable matter. After a distillation in vacuo with the aid of superheated steam a pale fatty acid mixture is obtained which has an acid value of 195.8, a saponification value of 196.7 and a content of unsaponifiable matter of 0.7 per cent.

In the manner described also alcohols of high molecular weight can be recovered from products of a partial conversion of the fatty acids, or of their derivatives, of fats or oils of vegetal, i. e. vegetable and animal origin, by a catalytic reduction with the aid of hydrogen, which products consist mainly of esters of the alcohols formed with the initial fatty acids, some initial material and free alcohols.

What we claim is:

1. In the separation of volatile, unsaponifiable matter of high molecular weight from saponifiable high molecular materials containing the same, by saponification and distillation, the step which comprises converting, by saponification, the saponifiable constituents into an aqueous mixture of magnesium, calcium and potassium soaps in such relative proportions that the melting point of the crude saponification product, when in the anhydrous state, is below 150° C., the said volatile unsaponifiable matter being separated from the said aqueous soap mixture by distillation.

2. In the separation of volatile, unsaponifiable matter of high molecular weight from saponifiable high molecular materials containing the same, by saponification and distillation, the step which comprises converting, by saponification, the saponifiable constituents into an aqueous mixture of magnesium, calcium and potassium soaps in the ratio of from about 10 to about 50 per cent of calcium and potassium soaps, the remaining quantity up to 100 per cent consisting of magnesium soaps, the quantity of calcium soaps being at the most 65 per cent of the mixture of calcium and potassium soaps, the said volatile unsaponifiable matter being separated from the said aqueous soap mixture by distillation.

3. In the separation of volatile, unsaponifiable matter of high molecular weight from saponifiable high molecular materials containing the same, by saponification and distillation, the step which comprises converting, by saponification, the saponifiable constituents into an aqueous mixture of magnesium, calcium and potassium soaps in the ratio of from about 14 to about 20 per cent each of calcium and potassium soaps, the remaining quantity up to 100 per cent consisting of magnesium soaps, the said volatile unsaponifiable matter being separated from the said aqueous soap mixture by distillation.

4. In the separation of volatile, unsaponifiable matter of high molecular weight from saponifiable high molecular materials containing the same, by saponification and distillation while introducing an inert gaseous agent, the step which comprises converting, by saponification, the saponifiable constituents into an aqueous mixture of magnesium, calcium and potassium soaps in the ratio of from about 14 to about 20 per cent each of calcium and potassium soaps, the remaining quantity up to 100 per cent consisting of magnesium soaps, the said volatile unsaponifiable matter being separated from the said aqueous soap mixture by distillation.

5. In the separation of volatile, unsaponifiable matter of high molecular weight from saponifiable high molecular materials containing the same, by saponification and distillation, while introducing an inert gaseous agent and a finely divided liquid having a boiling point below the temperature of distillation, the step which comprises converting, by saponification, the saponifiable constituents into an aqueous mixture of magnesium, calcium and potassium soaps in the ratio of from about 14 to about 20 per cent each of calcium and potassium soaps, the remaining quantity up to 100 per cent consisting of magnesium soaps, the said volatile unsaponifiable matter being separated from the said aqueous soap mixture by distillation.

6. In the separation of volatile, unsaponifiable matter of high molecular weight from a crude oxidation product of paraffin, by saponification and distillation, the step which comprises converting, by saponification, the saponifiable constituents into an aqueous mixture of magnesium, calcium and potassium soaps in the ratio of about 15 per cent each of calcium and potassium soaps, the remaining quantity up to 100 per cent consisting of magnesium soaps, the said volatile unsaponifiable matter being separated from the said aqueous soap mixture by distillation.

7. In the separation of volatile, unsaponifiable matter of high molecular weight from a crude oxidation product of paraffin, by saponification and distillation, while introducing wet steam at a pressure below atmospheric pressure, the step which comprises converting, by saponification, the saponifiable constituents into an aqueous mixture of magnesium, calcium and potassium soaps in the ratio of about 15 per cent each of calcium and potassium soaps, the remaining quantity up to 100 per cent consisting of magnesium soaps, the said volatile unsaponifiable matter being separated from the said aqueous soap mixture by distillation.

8. In the separation of volatile, unsaponifiable matter of high molecular weight from a mixture of the acids of fats and oils with alcohols corresponding to the said acids and esters of the said acids with said alcohols, obtained by an incomplete hydrogenating reduction of the said acids, the step which comprises converting, by saponification, the saponifiable constituents into an aqueous mixture of magnesium, calcium and potassium soaps in the ratio of about 15 per cent each of calcium and potassium soaps, the remaining quantity up to 100 per cent consisting of magnesium soaps, the said volatile unsaponifiable matter being separated from the said aqueous soap mixture by distillation.

9. In the separation of volatile, unsaponifiable matter of high molecular weight from sperm oil, by saponification and distillation, the step which comprises converting, by saponification, the saponifiable constituents into an aqueous mixture of magnesium, calcium and potassium soaps in the ratio of about 15 per cent each of calcium and potassium soaps, the remaining quantity up to 100 per cent consisting of magnesium soaps, the said volatile unsaponifiable matter being separated from the said aqueous soap mixture by distillation.

MAX SCHELLMANN.
HANS FRANZEN.